Nov. 10, 1964  R. C. DEMI  3,156,281
FASTENER ASSEMBLY WITH RESILIENT LOCKING RETAINER
Filed Nov. 4, 1960

United States Patent Office 3,156,281
Patented Nov. 10, 1964

3,156,281
FASTENER ASSEMBLY WITH RESILIENT
LOCKING RETAINER
Roy C. Demi, Greensburg, Pa., assignor to Robertshaw Controls Company, a corporation of Delaware
Filed Nov. 4, 1960, Ser. No. 67,209
1 Claim. (Cl. 151—36)

This invention relates to fastening devices and particularly is concerned with a bolt and a washer assembly whereby the bolt is retained in position on an unassembled part such as a valve or thermostat. The device is especially useful in attaching subassemblies, such as valves, thermostats, and the like, to appliances such as stoves in that it alleviates the problem of matching shipments of bolts with the shipments of the valves or thermostats and also the problem created by lost bolts.

An object of this invention is to provide a bolt and washer assembly that can be preassembled with unassembled parts so that sufficient bolts or screws will be furnished with the unassembled parts.

A more specific object of this invention is to provide a bolt and washer assembly capable of being inserted into a bolt hole whereby the washer impinges against the sidewalls of the bolt hole to retain the bolt therein.

Other objects and advantages of the present invention will be apparent from the following description of the drawings wherein.

Figure 1:
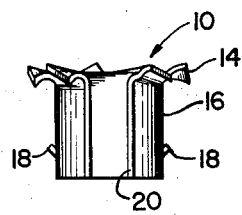
FIG. 1 is an elevational view of a lock washer.
Figure 2:
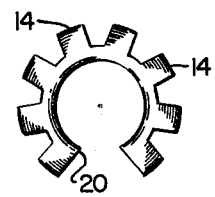
FIG. 2 is a plan view of the lock washer of FIG. 1.

Referring now to FIG. 1, a washer 10, preferably of spring metal, is shown having a cylindrical portion 16 which is split as shown at 20. Disposed at the upper end of cylindrical portion 16 is a washer member including a plurality of teeth 14 which project radially at substantially right angles to the axis of cylindrical portion 16. Teeth 14 are twisted at an angle to the horizontal of approximately 30° to provide a locking surface for the head of a bolt. Projecting from the wall of cylindrical portion 16 intermediate the ends thereof is a plurality, in this instance two, of oppositely disposed tab members 18.

Figure 3:
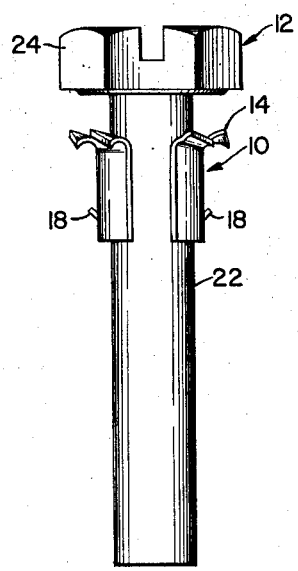
FIG. 3 is an elevation view of a bolt blank and lock washer in assembled relationship.

Referring now to FIG. 3, a bolt blank 12 is shown having a shank 22 and a head 24. The washer member 10 has an inner diameter slightly larger than the diameter of shank 22 and is slipped onto the shank 22 prior to the bolt being threaded. The bolt blank is then threaded as shown at 20 in FIG. 4. Threads 20 are rolled threads and the diameter of the shank is less than the major diameter of the thread. The inner diameter of the cylindrical portion 16 of washer member 10 is likewise smaller than the major diameter of threads 20. Accordingly, threads 20 retain washer member 10 loosely on the shank 22.

Figure 4:
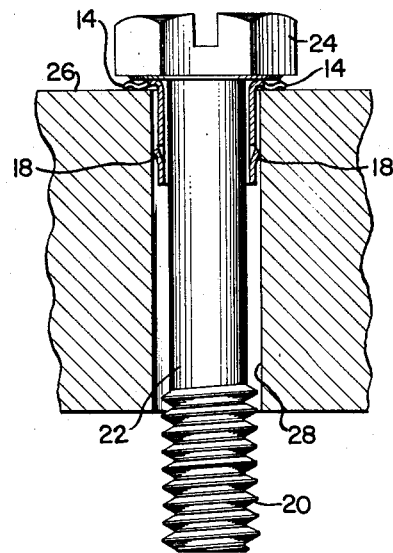
FIG. 4 is an elevational view, partly in section, of a bolt and washer assembly inserted into a bolt hole with parts broken away.

In FIG. 4 is shown a flange 26 of a device such as a thermostat having a mounting hole 28 therein. The diameter of mounting hole 28 is sufficiently larger than the major diameter of threads 20 so that there is a sufficient amount of clearance between the diameter of hole 28 and the diameter of the shank 22 to provide clearance for the washer 10 and still permit the bolt 12 to turn freely. In order for split cylindrical portion 16 to be inserted into hole 28, it must be radially compressed to provide clearance for tab members 18. When the assembly is pushed into the mounting hole, tab member 18 and the expansion of cylindrical portion 16 against the wall of the hole 28 prevent any backward movement. Washer 10 in turn holds the bolt 12 in place since the diameter of threads 20 is larger than the diameter of cylindrical portion 16 of washer 10. Cylindrical portion 16 of washer 10 also serves as a bushing around the shank diameter of the bolt to insure good alignment of the bolt 12 in the mounting hole 28.

Tab members 18 may be omitted when the diameter of the mounting hole is less than the unstressed outer diameter of cylindrical portion 16, since expansion of the cylindrical portion 16 against the wall of the hole will serve to retain the assembly in the hole.

When the flange 26 is finally mounted with its mating part (not shown) and the head 24 is tightened against the flange 26, the head 24 abuts the teeth 14 of the washer 10. Teeth 14 serve to prevent any reverse rotation of the bolt; thus, washer 10 serves as a lock washer, a bushing, and a bolt retaining member.

Thus, it is seen that the bolt and washer assembly of this invention is adapted for insertion in mounting holes of parts such as valves, thermostats, and the like, wherein the washer 10 serves to anchor the bolt within a mounting hole so that the bolt cannot fall out and become lost even prior to the time when the bolt engages the mating part.

It will be apparent to those skilled in the art that many modifications of the disclosed embodiment of this invention may be made without departing from the scope thereof which is to be measured by the appended claim.

I claim:

The combination of a member having a flange with a mounting hole therein, a bolt and washer assembly adapted to be mounted in said hole, said bolt having a head portion with a clamping surface thereon and a shank portion having a threaded portion and an unthreaded portion, said threaded portion being spaced from said head portion and being of larger diameter than said unthreaded portion, said washer being of resilient material and having a split cylindrical portion slidably mounted on said unthreaded portion, said washer having a washer member integrally interconnected to said cylindrical portion, said washer having an inner diameter less than the diameter of said threaded portion when said washer is not stressed, said washer being disposed on said shank of said bolt before said threaded portion thereof is formed, and a plurality of tab members projecting outwardly from said cylindrical portion and adapted for engaging the wall of said hole, said tab members being integrally connected to the cylindrical portion intermediate its ends with the free ends of the tab members projecting outwardly and angularly therefrom toward said washer member of said washer, said cylindrical portion being radially compressible for clearance of said wall by said tab members during assembly whereby subsequent engagement of said tab members with the wall of said hole retains said assembly in said hole, said washer member of said washer having a plurality of radially projecting teeth disposed between said bolt head and the flange of said member whereby when said bolt is tightened against said flange, said teeth prevent reverse rotation of said bolt head, said teeth being at one end of said washer and being twisted whereby they have one corner lying above and one corner lying below a plane passed through said end perpendicular to the axis of the washer.

References Cited in the file of this patent

UNITED STATES PATENTS

| | | |
|---|---|---|
| 1,409,606 | Stendahl | Mar. 14, 1922 |
| 2,201,793 | Sanborn | May 21, 1940 |
| 2,227,464 | Olson | Jan. 7, 1941 |
| 2,244,976 | Tinnerman | June 10, 1941 |
| 2,424,208 | Poupitch | July 15, 1947 |
| 2,709,470 | Knohl | May 31, 1955 |
| 2,931,412 | Wing | Apr. 5, 1960 |
| 2,938,405 | West | May 31, 1960 |
| 2,965,146 | Cox | Dec. 20, 1960 |
| 3,018,671 | Ogle et al. | Jan. 30, 1962 |
| 3,037,221 | Lanius | June 5, 1962 |